United States Patent
Lee et al.

(10) Patent No.: US 10,091,758 B2
(45) Date of Patent: Oct. 2, 2018

(54) METHOD FOR REPORTING MEASUREMENT RESULT FOR DETERMINING POSITION IN WIRELESS COMMUNICATION SYSTEM, AND DEVICE THEREFOR

(71) Applicant: LG ELECTRONICS INC., Seoul (KR)

(72) Inventors: Hyunho Lee, Seoul (KR); Kijun Kim, Seoul (KR); Jonghyun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/560,367

(22) PCT Filed: Mar. 21, 2016

(86) PCT No.: PCT/KR2016/002818
§ 371 (c)(1),
(2) Date: Sep. 21, 2017

(87) PCT Pub. No.: WO2016/153240
PCT Pub. Date: Sep. 29, 2016

(65) Prior Publication Data
US 2018/0077679 A1 Mar. 15, 2018

Related U.S. Application Data

(60) Provisional application No. 62/136,602, filed on Mar. 22, 2015.

(51) Int. Cl.
*H04W 64/00* (2009.01)
*H04W 4/00* (2018.01)
(Continued)

(52) U.S. Cl.
CPC ......... *H04W 64/006* (2013.01); *H04W 4/005* (2013.01); *H04W 4/70* (2018.02);
(Continued)

(58) Field of Classification Search
CPC . H04W 72/0413; H04W 16/14; H04W 72/14; H04W 88/08; H04W 16/32
See application file for complete search history.

(56) References Cited

U.S. PATENT DOCUMENTS

2012/0027110 A1 2/2012 Han et al.
2013/0188585 A1 7/2013 Sun et al.
(Continued)

FOREIGN PATENT DOCUMENTS

WO 2015/023224 A2 2/2015

*Primary Examiner* — Khalid Shaheed
(74) *Attorney, Agent, or Firm* — Dentons US LLP

(57) ABSTRACT

A method for reporting a measurement report for determining a position in a wireless communication system, according to one embodiment of the present invention, is performed by a terminal and may comprise the steps of: receiving positioning reference signal (PRS)-related information comprising a position identifier of each of a plurality of base stations; performing a measurement on the PRSs transmitted by each of the plurality of base stations; if the position identifiers of each of the plurality of base stations are identical to each other, selecting at least one measurement result among the measurement results for the PRSs; and reporting the selected measurement result to a serving base station.

12 Claims, 9 Drawing Sheets

(51) Int. Cl.
*H04W 88/02* (2009.01)
*H04W 8/02* (2009.01)
*H04W 4/70* (2018.01)

(52) U.S. Cl.
CPC ........... *H04W 8/02* (2013.01); *H04W 64/003* (2013.01); *H04W 88/02* (2013.01)

(56) References Cited

U.S. PATENT DOCUMENTS

| | | | |
|---|---|---|---|
| 2013/0203419 A1* | 8/2013 | Siomina | H04W 36/18 455/437 |
| 2014/0112184 A1 | 4/2014 | Chai | |
| 2014/0171111 A1 | 6/2014 | Xiao et al. | |
| 2015/0312789 A1* | 10/2015 | You | H04L 1/0693 370/252 |

* cited by examiner

METHOD FOR REPORTING MEASUREMENT RESULT FOR DETERMINING POSITION IN WIRELESS COMMUNICATION SYSTEM, AND DEVICE THEREFOR

This application is a 35 USC § 371 National Stage entry of International Application No. PCT/KR2016/002818 filed on Mar. 21, 2016, and claims priority to U.S. Provisional Application No. 62/136,602 filed on Mar. 22, 2015, all of which are hereby incorporated by reference in their entireties as if fully set forth herein.

TECHNICAL FIELD

The present invention relates to a wireless communication system, and more particularly, to a method for reporting a measurement result for position determination in a wireless communication system and device for the same.

BACKGROUND ART

Various techniques including Machine-to-Machine (M2M) communication and various devices requiring a high data rate, e.g., smart phones and tablet Personal Computers (PCs), have emerged and gained popularity. As a consequence, the amount of data to be processed in a cellular network is rapidly increasing. To satisfy the rapidly increasing data processing requirement, Carrier Aggregation (CA), cognitive radio, etc. for efficiently using a larger number of frequency bands, and Multiple Input Multiple Output (MIMO), Coordinated Multipoint transmission and reception (CoMP), etc. for increasing the amount of data transmitted in limited frequencies have been developed. Furthermore, communication environments are evolving toward an increased density of nodes accessible by User Equipments (UEs). A node refers to a fixed point having one or more antennas and capable of transmitting or receiving radio signals to or from UEs. A communication system with densely populated nodes can provide high-performance communication services to UEs through cooperation between nodes.

This multi-node cooperative communication scheme in which a plurality of nodes communicate with a UE using the same time-frequency resources offers a higher throughput than in a conventional communication scheme in which each node operates as an independent Base Station (BS) and communicates with a UE without cooperation from other nodes.

A multi-node system performs cooperative communication by using a plurality of nodes, each of which is operating as a BS, an Access Point (AP), an antenna, an antenna group, a Radio Remote Header (RRH) or a Radio Remote Unit (RRU). Compared to a conventional centralized antenna system in which antennas are concentrated in a BS, the plurality of nodes are normally spaced apart from each other by a predetermined distance or more in the multi-node system. The plurality of nodes may be managed by one or more BSs or one or more BS Controllers (BSCs) that control operation of each node or schedule data to be transmitted or received through each node. Each node is connected to a BS or BSC that controls the node through a cable or a dedicated line.

The above-described multi-node system may be regarded as an MIMO system in the sense that distributed nodes can communicate with a single UE or multiple UEs by transmitting or receiving different streams at the same time. However, since signals are transmitted using nodes distributed to various locations, each antenna covers a reduced transmission area in the multi-node system, relative to antennas in the conventional centralized antenna system. As a result, each antenna may need a reduced Tx power in transmitting a signal in the multi-node system, compared to a conventional system that implements MIMO with a centralized antenna system. In addition, as the transmission distance between an antenna and a UE is reduced, path loss is decreased and high-rate data transmission is possible. Accordingly, the transmission capacity and power efficiency of a cellular system may be increased and communication may satisfactorily be performed with uniform quality irrespective of the locations of UEs within a cell. Furthermore, the multi-node system boasts of reduced signal loss during transmission because a BS(s) or BSC(s) connected to a plurality of nodes cooperate in data transmission and reception. Also, if nodes located apart from each other by a predetermined distance or more perform cooperative communication with a UE, correlation and interference between antennas are decreased. Consequently, the multi-node cooperative communication scheme achieves a high Signal-to-Interference plus Noise Ratio (SINR).

Owing to these advantages of the multi-node system, the multi-node system has emerged as a promising basis for cellular communication by substituting for the conventional centralized antenna system or operating in conjunction with the conventional centralized antenna system in order to reduce BS deployment cost and backhaul maintenance cost, extend service coverage, and increase channel capacity and SINR.

DISCLOSURE OF THE INVENTION

Technical Tasks

One object of the present invention is to provide a method of reporting a measurement result for position determination in a wireless communication system and operation for the same.

It will be appreciated by persons skilled in the art that the objects that could be achieved with the present invention are not limited to what has been particularly described hereinabove and the above and other objects that the present invention could achieve will be more clearly understood from the following detailed description.

Technical Solutions

In one aspect of the present invention, provided herein is a method for reporting a measurement result for position determination in a wireless communication system, the method performed by a user equipment (UE) and comprising: receiving a positioning reference signal (PRS) related information including position identifiers of a plurality of base stations (BSs); measuring PRSs transmitted from the plurality of BSs using the PRS-related information; and if it is determined that there are at least two eNBs having the same position identifier by checking each of the position identifiers of the plurality of BSs included in the PRS-related information, reporting only partial measurement results among measurement results for PRSs transmitted from the at least two eNBs to a serving BS.

Additionally or alternatively, when a distance between the at least two eNBs is equal to or smaller than a specific value or when the at least two BSs belong to the same cluster, the position identifiers of the at least two eNBs have the same value.

Additionally or alternatively, among the measurement results for the PRSs transmitted from the at least two BSs, either a measurement result with the lowest reference signal time difference (RSTD) value or a measurement result with an RSTD value with the lowest uncertainty is reported.

Additionally or alternatively, among the measurement results for the PRSs transmitted from the at least two BSs, either a measurement result with the highest reference signal received power (RSRP) value or a measurement result with the highest reference signal received quality (RSRQ) value is reported.

Additionally or alternatively, reporting the only partial measurement results comprises reporting at least one of an identifier indicating an BS related to the partial measurement results, a reference signal received power (RSRP) value related to the partial measurement results, and a reference signal received quality (RSRQ) value related to the partial measurement results.

Additionally or alternatively, the method further comprising receiving, from the serving BS, an indicator indicating the number of BSs for which the UE needs to report measurement results among the at least two BSs.

Additionally or alternatively, the method further comprising transmitting, to the serving BS, an indicator indicating the number of BSs for which the UE will report measurement results among the at least two BSs.

In another aspect of the present invention, provided herein A user equipment (UE) configured to report a measurement result for position determination in a wireless communication system, the UE comprising: a radio frequency (RF) unit; and a processor, wherein the processor is configured to: control the RF unit to receive positioning reference signal (PRS) related information including position identifiers of a plurality of base stations (BSs), measure PRSs transmitted from the plurality of BSs using the PRS-related information, and if it is determined that there are at least two BSs having the same position identifier by checking each of the position identifiers of the plurality of BSs included in the PRS-related information, report only partial measurement results among measurement results for PRSs transmitted from the at least two BSs to a serving BS.

Additionally or alternatively, when a distance between the at least two BSs is equal to or smaller than a specific value or when the at least two BSs belong to the same cluster, position identifiers of the at least two BSs have the same value.

Additionally or alternatively, the processor is configured to report either a measurement result with the lowest reference signal time difference (RSTD) value or a measurement result with an RSTD value with the lowest uncertainty among the measurement results for the PRSs transmitted from the at least two BSs.

Additionally or alternatively the processor is configured to report either a measurement result with the highest reference signal received power (RSRP) value or a measurement result with the highest reference signal received quality (RSRQ) value among the measurement results for the PRSs transmitted from the at least two BSs.

Additionally or alternatively the processor is configured to report at least one of an identifier indicating an BS related to the partial measurement results, a reference signal received power (RSRP) value related to the partial measurement results, and a reference signal received quality (RSRQ) value related to the partial measurement results.

Additionally or alternatively the processor is further configured to receive, from the serving BS, an indicator indicating the number of BSs for which the UE needs to report measurement results among the at least two BSs.

Additionally or alternatively the processor is further configured to transmit, to the serving BS, an indicator indicating the number of BSs for which the UE will report measurement results among the at least two BSs.

Advantageous Effects

According to one embodiment of the present invention, it is possible to reduce error in position estimation and report a measurement result for position determination efficiently in a wireless communication system.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

Figure 1:
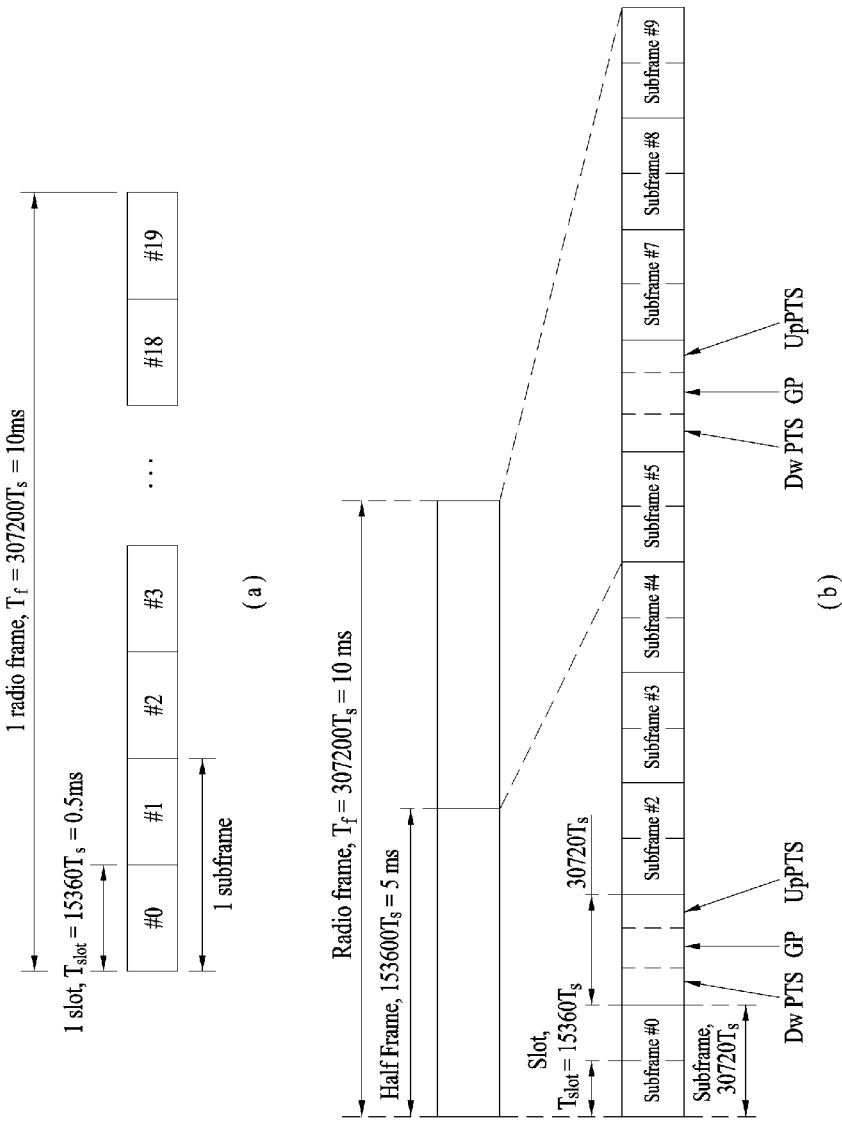
FIG. 1 illustrates a structure of a radio frame used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource.

Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowlegement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200Ts) and includes 10 subframes in equal size. The 10 subframes in the radio frame may be numbered. Here, Ts denotes sampling time and is represented as Ts=1/(2048*15 kHz). Each subframe has a length of 1ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | | |
| 5 | 6592 · $T_s$ | 4384 · $T_s$ | 5120 · $T_s$ | 20480 · $T_s$ | 4384 · $T_s$ | 5120 · $T_s$ |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |

Figure 2:
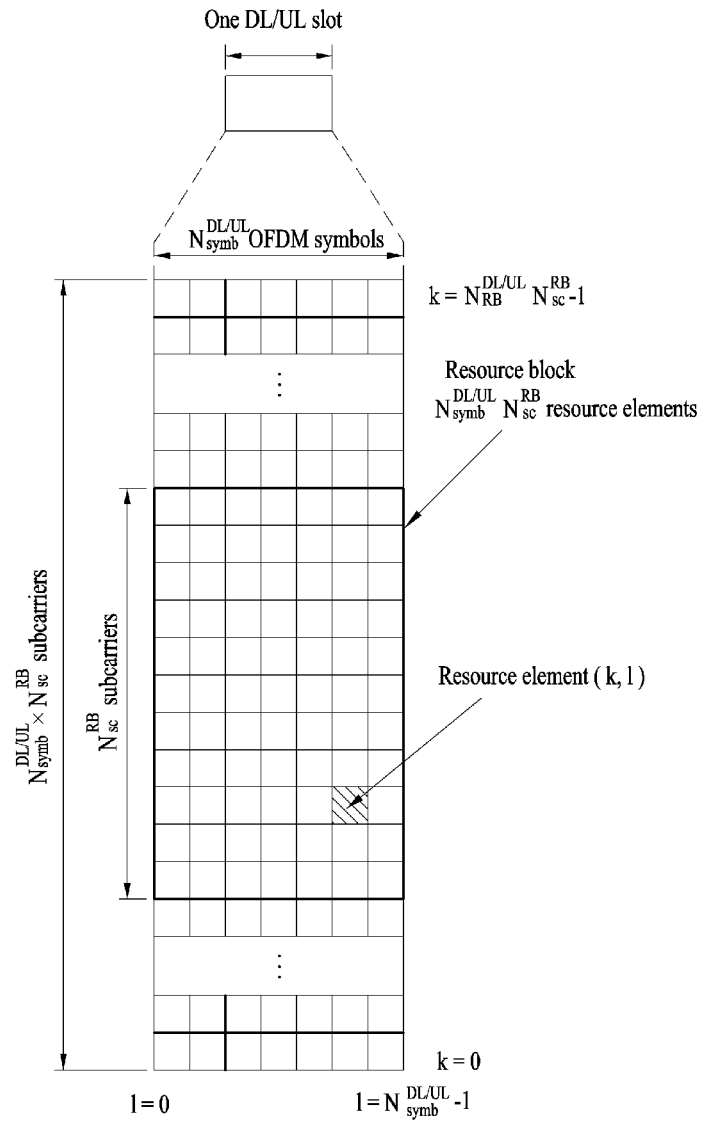
FIG. 2 illustrates structures of downlink/uplink (DL/UL) slots of a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL}*N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL}*N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL}*N_{sc}^{RB}$ REs. Each RE in a resource grid can be uniquely defined by an index pair (k, 1) in a slot. Here, k is an index in the range of 0 to $N_{symb}^{DL/UL}*N_{sc}^{RB}-1$ in the frequency domain and 1 is an index in the range of 0 to $N_{symb}^{DL/UL}-1$.

Two RBs, which occupy $N_{sc}^{RB}$ same continuous subcarriers for one subframe and are respectively located at two slots of the subframe, will be referred to as a pair of physical resource blocks (PRB). The two RBs constituting the PRB have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to NDLVRB-1, and NDLVRB=NDLRB is obtained. Accordingly, according to the localized mapping scheme, the VRBs having the same VRB number are mapped into the PRBs having the same PRB number at the first slot and the second slot. On the other hand, the distributed VRBs are mapped into the PRBs thorugh interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
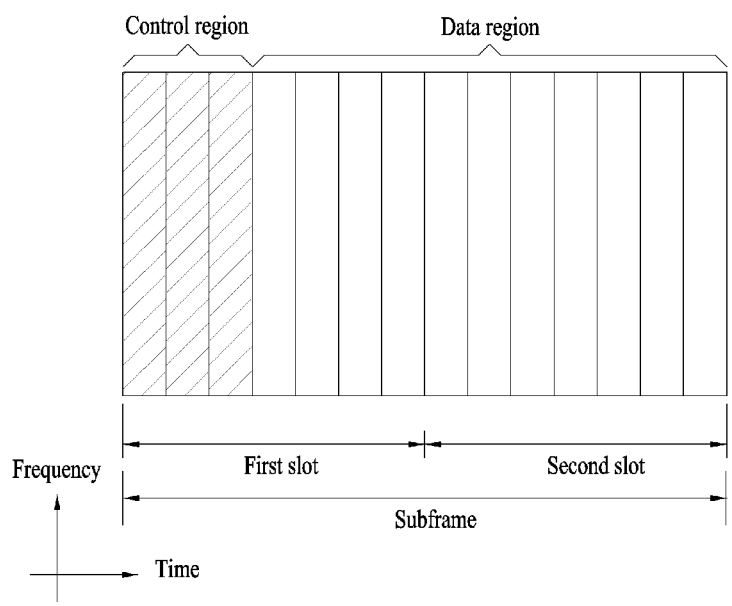
FIG. 3 illustrates a structure of a downlink (DL) subframe used in 3GPP LTE/LTE-A systems.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. The aggregation levels defining the search space are indicated as follows:

TABLE 3

Search Space

| Type | Aggregation Level L | Size [in CCEs] | Number of PDCCH candidates $M^{(L)}$ |
|---|---|---|---|
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g. frequency position) of "B" and transmission format information (e.g. transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
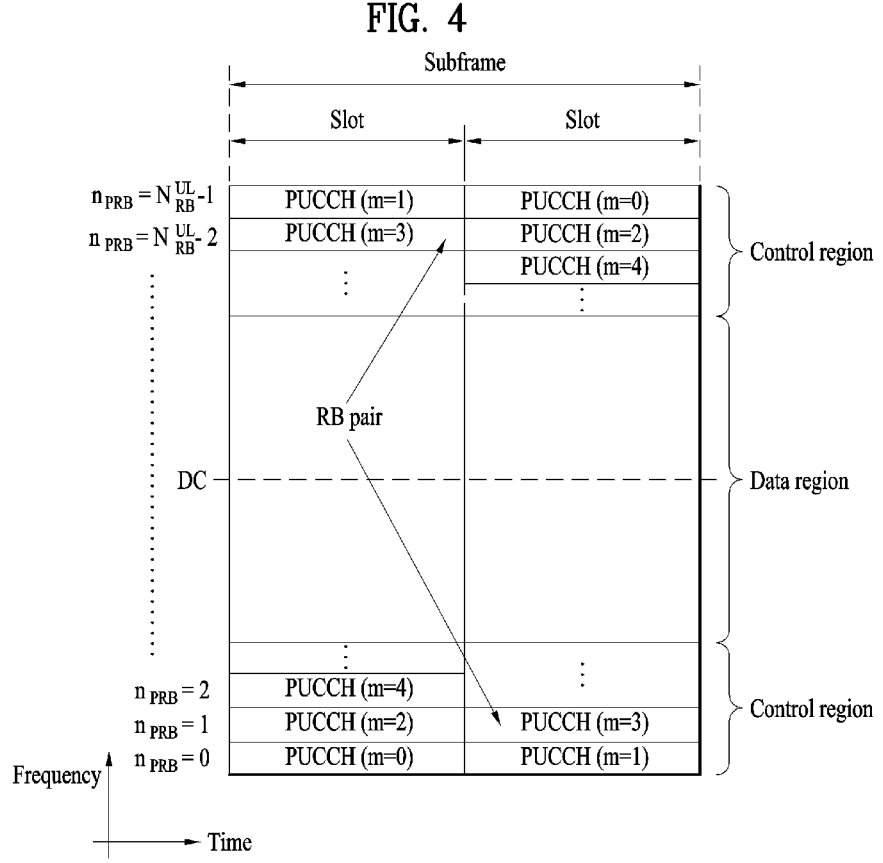
FIG. 4 illustrates a structure of an uplink (UL) subframe used in 3GPP LTE/LTE-A systems.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

In general, various methods has been used in a cellular communication system to allow a network to obtain position information of a UE. A positioning scheme based on OTDOA (observed time difference of arrival) is considered as a representative example of the methods. According to the OTDOA-based positioning scheme, in the LTE system, a UE receives information related to PRS (positioning reference signal) transmission of eNBs through higher layer signals and measures PRSs transmitted from cells adjacent to the UE. Thereafter, the UE transmits, to the eNB or network, an RSTD (reference signal time difference) corresponding to a difference between a reception time of a PRS transmitted from a reference eNB and a reception time of a PRS transmitted from a neighbor eNB. The network calculates a position of the UE by using the RSTD and other information. In addition, there are other methods such as an assisted global navigation satellite system (A-GNSS) positioning scheme, an enhanced cell-ID (E-CID) scheme, and an uplink time difference of arrival (UTDOA) scheme. Such positioning methods can be utilized for various location-based services (e.g., advertisement, position tracking, emergency communication means, and the like).

The above-mentioned conventional positioning schemes have been supported in 3GPP UTRA and E-UTRA standards (e.g., LTE Rel-9). In particular, higher accuracy has been required in an in-building positioning scheme. Even though the conventional positioning schemes can be commonly applied to both outdoor and indoor environments, typical positioning accuracy is estimated as, for example, in the case of the E-CID scheme, 150 m in an NLOS (non-LOS) environment and 50 m in a LOS environment. In addition, the OTDOA scheme based on the PRS has a limitation in that positioning error may exceed 100 ms due to eNB synchronization error, multipath propagation error, UE's RSTD measurement quantization error, timing offset estimation error, etc. Moreover, in the case of the A-GNSS scheme, since a GNSS receiver is required, it has a limitation in that implementation complexity and battery consumption is increased. Further, the A-GNSS scheme is difficult to be applied to in-building positioning.

In the present disclosure, proposed is a method for allowing an eNB to calculate position information of a UE. According to the proposed method, a cellular network transmits a specific pilot signal (e.g., a specific reference signal that allows to identify each eNB/TP (transmission point)) to a UE. After measuring each pilot signal, the UE calculates positioning-related estimation values (e.g., OTDOA or RSTD estimation values) according to a specific positioning scheme and then reports the values to the eNB. Thereafter, the eNB can obtain the position information of the corresponding UE.

[LTE Positioning Protocol]

In the LTE system, an LTE positioning protocol (LPP) is defined to support the OTDOA scheme. In addition, according to the LPP, a UE is provided with OTDOA-ProvideAssistanceData with the configuration shown in Table 5 below as an IE (information element).

TABLE 5

-- ASN1START OTDOA-ProvideAssistanceData ::= SEQUENCE
{otdoa-ReferenceCellInfo OTDOA-ReferenceCellInco OPTIONAL,
-- Need ON otdoa-NeighbourCellInfo OTDOA-NeighbourCellInfoList
OPTIONAL, -- Need ON otdoa-Error OTDOA-Error OPTIONAL,
-- Need ON ...}-- ASN1STOP In Table 5, OTDOA-ReferenceCellInfo means a reference cell for RSTD (reference signal time difference) measurement and it is configured as shown in Table 6 below.

TABLE 6

-- ASN1START OTDOA-ReferenceCellInfo ::= SEQUENCE {
physCellId INTEGER (0..503), cellGlobalId ECGI OPTIONAL,
-- Need ON earfcnRef ARFCN-ValueEUTRA OPTIONAL, -- Cond
NotSameAsServ0 antennaPortConfig ENUMERATED {ports1-or-2,
ports4, ... } OPTIONAL, -- Cond NotSameAsServ1 cpLength
ENUMERATED { normal, extended, ... }, prsIndo PRS-Info
OPTIONAL, -- Cond PRS ..., [[ earfcnRef-v9a0 ARFCN-
ValueEUTRA-v9a0 OPTIONAL -- Cond NotSameAsServ2 ]]}
-- ASN1STOP Meanwhile, OTDOA-NeighbourCellInfo means cells (e.g., eNBs or TPs) corresponding to targets of the RSTD measurement. For up to three frequency layers, information on up to 24 neighbor cells may be included in each of the frequency layers. That is, information on up to 72 (=3*24) cells can be provided to the UE.

TABLE 7

-- ASN1STARTOTDOA-NeighbourCellInfoList ::= SEQUENCE (SIZE
(1..maxFreqLayers)) OF OTDOA-NeighbourFreqInfoOTDOA-NeighbourFreqInfo ::=
SEQUENCE (SIZE (1..24)) OF
OTDOA-NeighbourCellInfoElementOTDOA-NeighbourCellInfoElement ::=
SEQUENCE { phyCellId INTEGER (0...503), cellGlobalId ECGI OPTIONAL, --
Need ON earfcn ARFCN-ValueEUTRA OPTIONAL, -- Cond NotSameAsRef0
cpLength ENUMERATED {normal, extended, ...} OPTIONAL, -- Cond
NotSameAsRef1 prsInfo PRS-Info OPTIONAL, -- Cond NotSameAsRef2
antennaPortConfig ENUMERATED {ports-1-or-2, ports-4, ...} OPTIONAL, -- Cord
NotsameAsRef3 slotNumberOffset INTEGER (0..19) OPTIONAL, -- Cond
NotSameAsRef4 prs-SubframeOffset INTEGER (0..1279) OPTIONAL, -- Cond
InterFreq expectedRSTD INTEGER (0..16383), expectedRSTD-Uncertainty
INTEGER (0..1023), ..., [[ earfcn-v9a0 ARFCN-ValueEUTRA-v9a0 OPTIONAL --
Cond NotSameAsRef5 ]]}maxFreqLayers INTEGER ::= 3-- ASN1STOP In Table 7, PRS-info corresponding to an IE (information element) included in the OTDOA-ReferenceCellInfo and OTDOA-NeighbourCellInfo contains PRS (positioning reference signal) information. Specifically, the PRS-Info includes a PRS bandwidth, a PRS configuration index (IPRS), the number of consecutive downlink subframes, and PRS muting information as shown in Table 8.

TABLE 8

Figure 5:
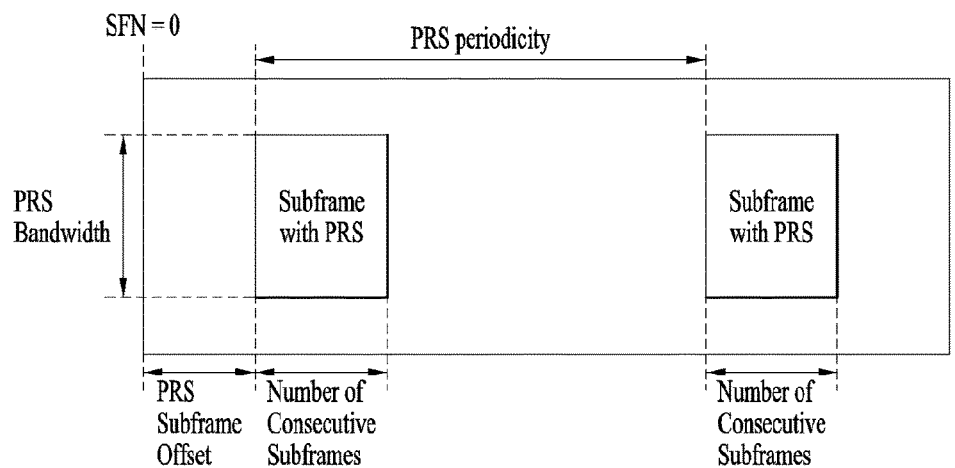
FIG. 5 illustrates a PRS (positioning reference signal) transmission configuration.

-- ASN1STARTPRS-Info ::= SEQUENCE { prs-Bandwidth
ENUMERATED { n6, n15, n25, n50, n75, n100, ... }, prs-
ConfigurationIndex INTEGER (0..4095), numDL-Frames
ENUMERATED {sf-1, sf-2, sf-4, sf-6, ...}, ..., prs-MutingInfo-r9
CHOICE { po2-r9 BIT STRING (SIZE(2)), po4-r9 BIT STRING
(SIZE(4)), po8-r9 BIT STRING (SIZE(8)), po16-r9 BIT STRING
(SIZE(16)), ... } OPTIONAL -- Need OP}-- ASN1STOP FIG. 5 illustrates a PRS (positioning reference signal) transmission configuration for the above-mentioned parameters.

In this case, PRS periodicity and PRS subframe offset are determined in accordance with a value of the IPRS (PRS configuration index) and Table 9 below shows corresponding relationships.

TABLE 9

| PRS Configuration Index ($I_{PRS}$) | PRS Periodicity (subframes) | PRS Subframe Offset (subframes) |
| --- | --- | --- |
| 0-159 | 160 | $I_{PRS}$ |
| 160-479 | 320 | $I_{PRS}$ − 160 |
| 480-1119 | 640 | $I_{PRS}$ − 480 |
| 1120-23399 | 1280 | $I_{PRS}$ − 1120 |

[PRS (Positioning Reference Signal)]

Figure 6:
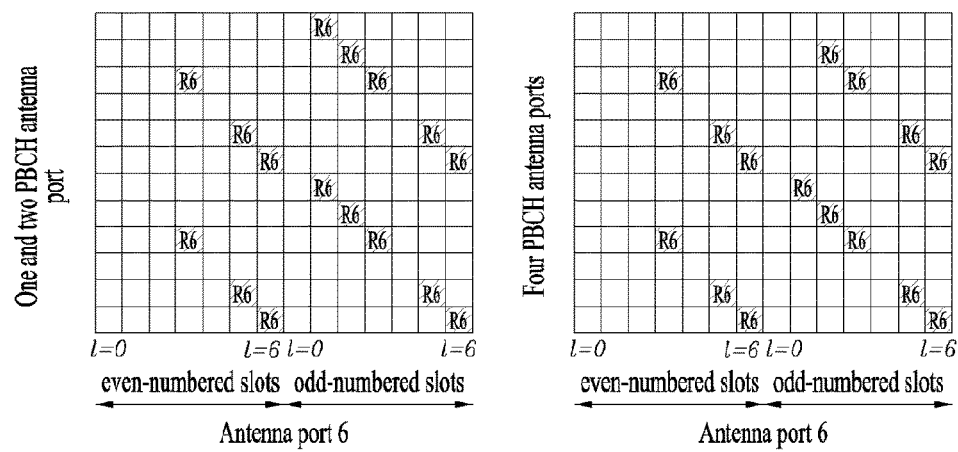
FIGS. 6 and 7 illustrate RE mapping in a PRS.
Figure 7:
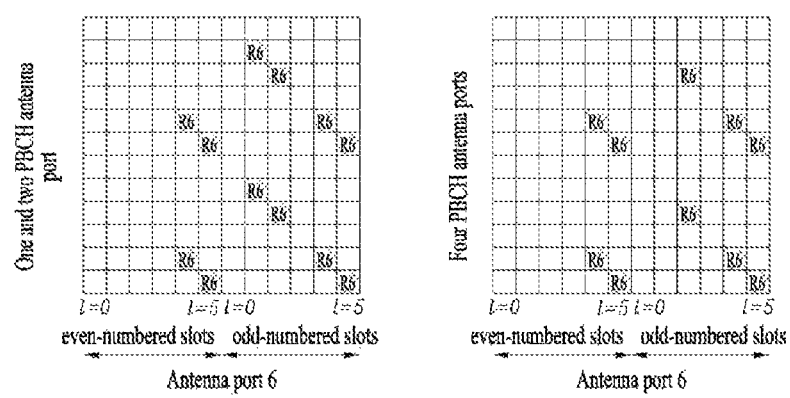

The PRS has a transmission occasion, that is, a positioning occasion at an interval of 160, 320, 640, or 1280 ms and it may be transmitted in N consecutive DL subframes at the positioning occasion where N may be 1, 2, 4, or 6. Although the PRS may be substantially transmitted at the positioning occasion, it may be muted for inter-cell interference control cooperation. Information on PRS muting is signaled to a UE through prs-MutingInfo. Unlike a system bandwidth of a serving eNB, a PRB transmission bandwidth may be independently configured and the PRS is transmitted in a frequency bandwidth of 6, 15, 25, 50, 75, or 100 resource blocks (RBs). A transmission sequence for the PRS is generated by initializing a pseudo-random sequence generator for every OFDM symbol using a function of a slot index, an OFDM symbol index, a cyclic prefix (CP) type, and a cell ID. The generated transmission sequences for the PRS are mapped to resource elements (REs) based on whether a normal CP or an extended CP is used, as shown in FIG. 6 (in the case of the normal CP) or FIG. 7 (in the case of the extended CP). A position of the mapped RE may be shifted on the frequency axis and a shift value is determined by the cell ID. FIGS. 6 and 7 show positions of REs for PRS transmission on the assumption that the frequency shift is 0.

According to the current LTE standard, an eNB/TP transmits a PRS to a UE, and the UE calculates a positioning-related estimation value (e.g., RSTD) by measuring the PRS unique to each eNB/TP and then reports the calculated positioning-related estimation value to the eNB. In this case, a location server of the network provides the UE with information on PRS-related configurations to be transmitted by a reference cell and a neighbor cell. In the positioning study of rel-13, methods for enhancing positioning performance by utilizing PRSs transmitted from a macro cell and small cells in a heterogeneous network where a cluster consisting of small cells exists are discussed. According to the positioning study, it is expected that as the number of neighbor eNBs' PRS configurations provided to the UE increases, the accuracy of the positioning-related estimation value, i.e., RSTD accuracy will be improved. However, degree of errors in the position may be changed according to a deployment status of eNBs/TPs, which is used in the position estimation. In detail, since a position estimation error from a plurality of eNBs/TPs located away by a similar distance is relatively greater than that from an eNB/TP located away by a proper distance, the position estimation accuracy may be degraded. Therefore, the present invention proposes a method for selecting neighbor cells by considering deployment of eNBs/TPs and providing a UE with PRS-related configurations for the selected neighbor cells. Hereinafter, operations in the LTE system will be described as particular embodiment of operations proposed in the present invention.

According to a particular embodiment of the present invention, an identical position identifier is allocated to eNBs/TPs located within a predetermined distance and an information element (IE) for positioning, which contains the position identifier, is provided to a UE. That is, the UE can determine that the eNBs/TPs with the identical position identifier are located within the predetermined distance.

For example, an identical position identifier may be allocated to small cells belonging to the same cluster in a specific macro cell, and the position identifier may be provided to a UE through PRS-related information. The position identifier may be included in the form of "clusteredCellId" in the OTDOA-ReferenceCellInfo or OTDOA-NeighbourCellInfo as shown in Tables 10 and 11.

TABLE 10

-- ASN1STARTOTDOA-ReferenceCellInfo ::= SEQUENCE
{ physCellId INTEGER (0..503), clusteredCellId INTEGER
(0..23), OPTIONAL, ... }-- ASN1STOP

TABLE 11

-- ASN1STARTOTDOA-NeighbourCellInfoElement ::= SEQUENCE
{ physCellId INTEGER (0..503), clusteredCellId INTEGER
(0..23), OPTIONAL, ... }-- ASN1STOP When the identical position identifier is allocated to the eNBs/TPs located within the predetermined distance and the IE for positioning including the position identifier is provided to the UE, the UE can measure RSTDs for the respective eNBs/TPs with the identical position identifier and then report only a RSTD for one eNB/TP selected from among the eNBs/TPs. Alternatively, after measuring the RSTDs for the respective eNBs/TPs with the identical position identifier, the UE can select some eNBs/TPs from among the eNBs/TPs and then report RSTDs for the selected eNBs/TPs.

As a method for selecting an eNB/TP, after measuring the eNBs/TPs with the identical position identifier, the UE may select an eNB/TP with the lowest RSTD and then report the lowest RSTD of the selected eNB/TP. Alternatively, the UE may select an eNB/TP with the highest reference signal received power (RSRP) or reference signal received quality (RSRQ) and then report an RSTD of the selected eNB/TP. As another method, after measuring the eNBs/TPs with the identical position identifier, the UE may select an eNB/TP with the best quality of RSTD, i.e., the lowest uncertainty and then reports the RSTD of the selected eNB/TP.

In addition, when the UE selects some or one of the eNBs/TPs and then reports the measurement result of the selected eNB/TP, the UE can also report a physical cell ID (PCID) indicating the corresponding eNB/TP or an identifier equivalent to the PCID. Moreover, the UE can also report other measurement values such as power, signal strength quality, and the like of a signal received from the corresponding eNB/TP.

When the identical position identifier is allocated to the eNBs/TPs located within the predetermined distance and the IE for positioning including the position identifier is provided to the UE, information on the number of eNBs/TPs to be measured among the eNBs/TPs with the identical position identifier can be signaled. That is, when the UE receives configurations of the eNBs/TPs with the identical position identifier, the UE may inform a network of the number of eNBs/TPs that the UE will measure and/or the number of eNBs/TPs that the UE will report through signaling.

When the IE for positioning is provided to the UE, the IE may include information on up to 24 neighbor cells. To improve the positioning performance, it is preferred to collect measurement results of eNBs/TPs located relatively far away from each other rather than those of a multitude of eNBs/TPs located at similar positions.

As one method, for a multitude of eNBs/TPs located within a predetermined distance, only a single OTDOA-NeighbourCellInfoElement is provided to a UE. To this end, the eNBs/TPs located within the predetermined distance may set (some or) all parameters related to cyclic prefix (CP) length, antenna port, slot number offset, subframe offset, PRS transmission bandwidth, PRS configuration, the number of consecutive DL subframes constituting a positioning occasion, etc. to have the same values.

If there is a parameter(s) with a different value, a plurality of configurations may be included in the single OTDOA-NeighbourCellInfoElement and then provided to the UE.

A PCID of each of the multitude of eNBs/TPs located within the predetermined distance may be included in the single OTDOA-NeighbourCellInfoElement and provided to the UE. If there are two or more PCIDs in the single OTDOA-NeighbourCellInfoElement, the UE may determine that the corresponding OTDOA-NeighbourCellInfoElement is for PRS-related configuration information for the multitude of eNBs/TPs located within the predetermined distance.

In some embodiments, a flag for indicating whether the OTDOA-NeighbourCellInfoElement is for PRS-related configurations for the multitude of eNBs/TPs located within the predetermined distance may be included in the corresponding OTDOA-NeighbourCellInfoElement and provided to the UE. After receiving the flag, the UE may determine that the corresponding OTDOA-NeighbourCellInfoElement relates to the PRS-related configurations for the multitude of eNBs/TPs located within the predetermined distance.

If the UE determines that a specific OTDOA-NeighbourCellInfoElement relates to the PRS-related configurations for the multitude of eNBs/TPs located within the predetermined distance, the UE may measure PRSs from the multitude of eNBs/TPs, collect the PRSs as one thing (e.g., averaging) and then reports it. Alternatively, the UE may measure one eNB/TP by selecting the eNB/TP from the multitude of eNBs/TPs and then report it. For example, the UE may select an eNB/TP with the highest RSRP (or RSRQ) from among the multitude of eNBs/TPs located within the predetermined distance and then measure and report a PRS for the selected eNB/TP only.

As another method, when neighbor cells included in the OTDOA-NeighbourCellInfoElement are selected, eNBs/TPs can be selected by considering distances between the neighbor cells, and the selected eNBs/TPs can be provided to a UE. Specifically, if a distance between two eNBs/TPs is equal to or smaller than a predetermined value, an eNB/TP with higher RSRP or RSRQ may be selected from the two eNBs/TPs. Thereafter, the selected eNB/TP may be included in the OTDOA-NeighbourCellInfo and then provided to the UE. Similarly, if a multitude of eNBs/TPs are located within a prescribed radius, an eNB/TP with the highest RSRP or RSRQ may be selected from the multitude of eNBs/TPs. Thereafter, the selected eNB/TP may be included in the OTDOA-NeighbourCellInfo and then provided to the UE. Further, if a multitude of eNBs/TPs are located within a prescribed radius, some eNBs/TPs with relatively higher RSRPs or RSRQs may be selected from the multitude of eNBs/TPs and then the selected eNBs/TPs may be included in the OTDOA-NeighbourCellInfo to be provided to the UE.

Figure 8:
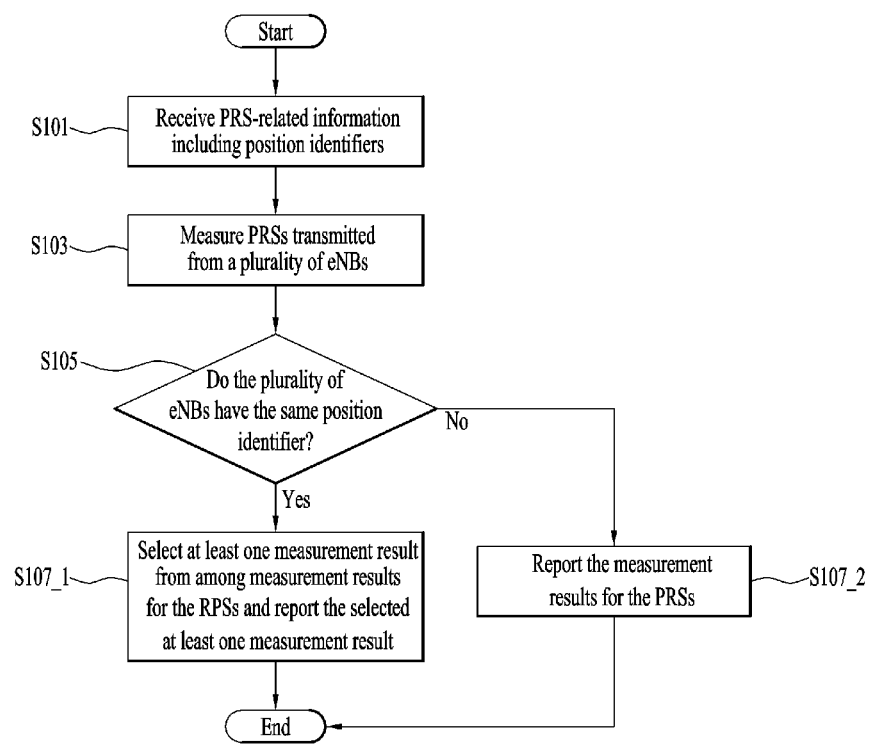
FIG. 8 is a flowchart illustrating a measurement reporting operation performed by a user equipment according to one embodiment of the present invention.

FIG. 8 is a flowchart for explaining operation of a UE according to an embodiment of the present invention.

Referring to FIG. 8, a UE can receive PRS-related information including a position identifier [S101]. The PRS-related information may be provided by a location server. For example, the PRS-related information may be OTDOA-ReferenceCellInfo in Table 10 or OTDOA-NeighbourCellInfo in Table 11 and the position identifier may be clusteredCellId in Table 10 or 11.

The UE can receive PRSs transmitted from a plurality of eNBs and then measure the received PRSs [S103]. The measurement can be performed by calculating reference signal time difference (RSTD) values for the respective PRSs. In some embodiments, when the plurality of eNBs have the same position identifier, the UE may receive, from a serving eNB, an indicator indicating the number of eNBs that the UE needs to measure or report among the plurality of eNBs. Alternatively, when the plurality of eNBs have the same position identifier, the eNB may determine the number of eNBs that the UE will measure or report among the plurality of eNBs and transmit an indicator indicating the number of the eNBs to the serving eNB.

Thereafter, the UE can determine whether the plurality of eNBs have the same position identifier [S105]. For example, when a distance between the plurality of eNBs is equal to or smaller than a specific value or when the plurality of eNBs belong to the same cluster, the plurality of eNBs may have the same position identifier.

That is, when the plurality of eNBs have the same position identifier, the UE can determine that the distance between the plurality of eNBs is equal to or smaller than the specific value. In this case, the UE can select at least one measurement result from among measurement results for the RPSs and report the selected at least one measurement result to the serving eNB [S107_1]. In some embodiments, the UE may select a measurement result with the lowest reference signal time difference (RSTD) value or a measurement result with an RSTD value with the lowest uncertainty from among the measurement result for the PRSs. Alternatively, the UE may select a measurement result with the highest reference signal received power (RSRP) value or a measurement result with the highest reference signal received quality (RSRQ) value from among the measurement results for the PRSs. In some embodiments, when reporting the selected measurement result, the UE may report at least one of an identifier indicating an eNB related to the selected measurement result, an RSRP value related to the selected measurement result, and an RSRQ value related to the selected measurement result together.

When the plurality of eNBs do not have the same identifier, the UE can determine that the distance between the plurality of eNBs is greater than the specific value and report the measurement results for the PRSs to the serving eNB [S107_2].

Figure 9:
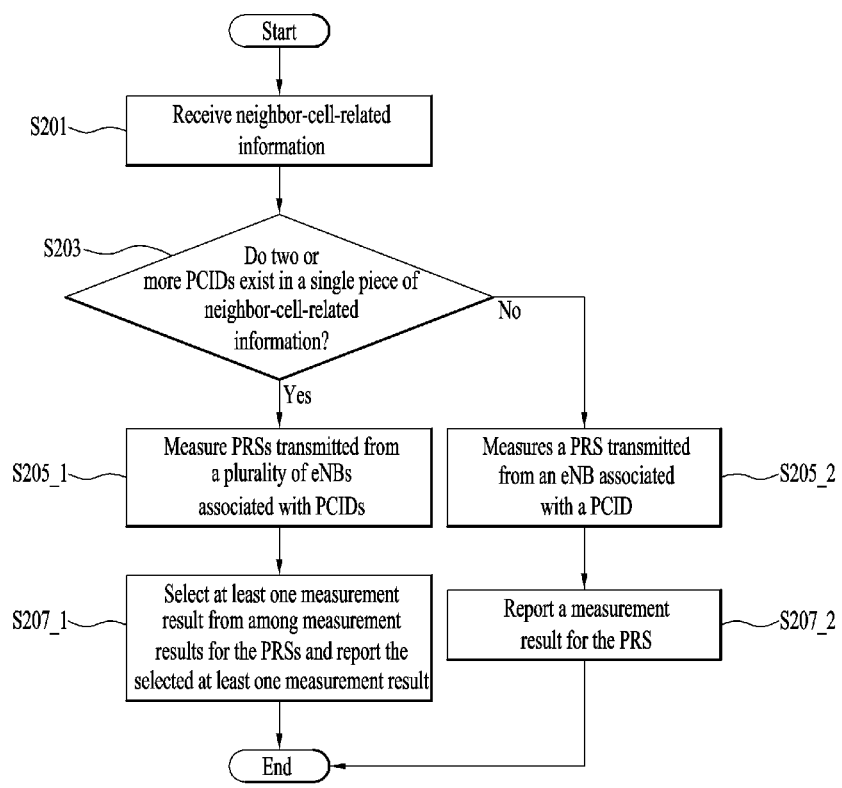
FIG. 9 is a flowchart illustrating an aperiodic PRS transmission operation performed by an eNB according to one embodiment of the present invention.

FIG. 9 is a flowchart for explaining operation of a UE according to an embodiment of the present invention.

Referring to FIG. 9, a UE can receive neighbor-cell-related information [S201]. The neighbor-cell-related information may be provided by a location server. For example, the neighbor-cell-related information may be OTDOA-NeighbourCellInfo in Table 11.

After receiving the neighbor-cell-related information, the UE determines whether two or more physical cell IDs (PCIDs) exist in a single piece of neighbor-cell-related information [S203]. When two or more PCIDs exist in a single piece of neighbor-cell-related information, the UE may determine that the corresponding neighbor-cell-related information is information on a plurality of eNBs located within a predetermined distance. Alternatively, the received neighbor-cell-related information may contain a flag for explicitly indicating that the corresponding neighbor-cell-related information is the information on the plurality of eNBs located within the predetermined distance.

When two or more PCIDs exist in a single piece of neighbor-cell-related information, the UE can measure PRSs transmitted from a plurality of eNBs associated with the corresponding PCIDs [S205_1]. Thereafter, the UE can select at least one measurement result from among measurement results for the PRSs and report the selected at least one measurement result to a serving eNB [S207_1]. In this case, selection and reporting of the measurement result may be performed in a similar manner as the step S107_1 described with reference to FIG. 8. To avoid redundant description, the aforementioned features shall be omitted in the following description.

Meanwhile, when only one PCID exists in a single piece of neighbor-cell-related information, the UE may determine that the corresponding neighbor-cell-related information is information on a single eNB. Thus, the UE measures a PRS transmitted from an eNB associated with the corresponding PCID [S205_2] and report a measurement result for the PRS to the serving eNB [S207_2].

Figure 10:
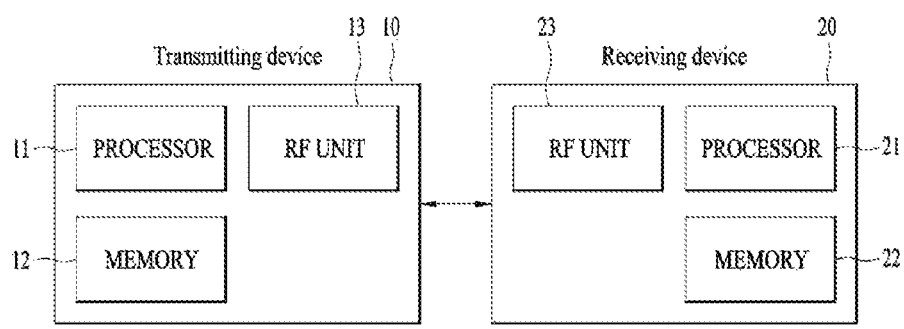
FIG. 10 is a block diagram of devices for implementing the embodiment(s) of the present invention.

FIG. 10 is a block diagram illustrating components of a transmitting device 10 and a receiving device 20 for implementing the embodiments of the present invention. The transmitting device 10 and receiving device 20 respectively include radio frequency (RF) units 13 and 23 for transmitting and receiving radio signals carrying information, data, signals, and/or messages, memories 12 and 22 for storing various information related to communication in a wireless communication system, and processors 11 and 21, which are functionally connected to the RF units 13 and 23 and the memories 12 and 22, configured to control the components in order to enable the transmitting device 10 and receiving device 20 to perform at least one of the above-described embodiments of the present invention.

The memories 12 and 22 may store programs for processing and controlling the processors 11 and 21 and temporarily store input/output information. The memories 12 and 22 may be used as buffers. The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, microcomputers or the like. The processors 11 and 21 may be implemented by hardware, firmware, software, or a combination thereof. When the present invention is implemented using hardware, application specific integrated circuits (ASICs), digital signal processors (DSPs), digital signal processing devices (DSPDs), programmable logic devices (PLDs), or field programmable gate arrays (FPGAs) may be included in the processors 11 and 21. When the present invention is implemented using firmware or software, the firmware or software may be configured to include modules, procedures, functions, etc. for performing the functions or operations of the present invention. The firmware or software configured to implement the present invention may be included in the processors 11 and 21 or stored in the memories 12 and 22 so as to be driven by the processors 11 and 21.

The processor 11 of the transmitting device 10 performs predetermined coding and modulation for a signal and/or data to be transmitted to the outside after being scheduled by the processor 11 or a scheduler connected to the processor 11, and then transmits the coded and modulated signal and/or data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer equal to or greater than 1) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ receive antennas and frequency down-converts each of signals received through receive antennas to restore each signal as a baseband signal. In addition, the RF unit 23 may include an oscillator for frequency down-conversion. The processor 21 decodes and demodulates the radio signals received through the receive antennas and restores data that the transmitting device 10 originally desires to transmit.

The RF units 13 and 23 include one or more antennas. An antenna performs a function for transmitting signals processed by the RF units 13 and 23 to the outside or transferring radio signals to the RF units 13 and 23 after receiving the radio signal from the outside under the control of the processors 11 and 21 according to an embodiment of the present invention. The antenna may also be called an antenna port. Each antenna may correspond to one physical antenna or may be configured by a combination of more than one physical antenna element. The signal transmitted from each antenna cannot be further deconstructed by the receiving device 20. A reference signal (RS) transmitted in correspondence to a corresponding antenna defines an antenna viewed from the receiving device 20 and enables the receiving device 20 to perform channel estimation for the antenna, irrespective of whether it is a single radio channel from one physical antenna or a composite channel from a plurality of physical antenna elements including the antenna. In other words, the antenna is defined such that a channel carrying a symbol of the antenna may be obtained from a channel carrying another symbol of the same antenna. An RF unit supporting the multi-input multi-output (MIMO) function of transmitting and receiving data using a plurality of antennas may be connected to two or more antennas.

In the embodiments of the present invention, a UE operates as the transmitting device 10 in uplink and as the receiving device 20 in downlink. In the embodiments of the present invention, an eNB operates as the receiving device 20 in uplink and as the transmitting device 10 in downlink.

The transmitting device 10 and/or the receiving device 20 can be configured to implement at least one of the above-described embodiments of the present invention or combinations of at least two thereof.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention can be applied to various wireless communication devices such as a UE, a relay, an eNB, and the like.

What is claimed is:

1. A method for reporting a measurement result for position determination in a wireless communication system, the method performed by a user equipment (UE) and comprising:
    receiving positioning reference signal (PRS) related information including position identifiers of a plurality of base stations (BSs);
    measuring a PRS transmitted from each of the plurality of BSs using the PRS-related information;
    checking whether there are at least two BSs having the same position identifier among the plurality of BSs based on the PRS-related information;
    when at least two of the BSs have the same position identifier, reporting, to a serving BS, a number of PRS measurement results, wherein the number of measurement results reported is less than the number of BSs that make up the plurality of base stations, and
    wherein the position identifiers of the at least two BSs are the same, when a distance between the at least two BSs is equal to or smaller than a specific value.

2. The method of claim 1, wherein among the measurement results for the PRSs transmitted from the at least two BSs, the measurement result with the lowest reference signal time difference (RSTD) value or the measurement result with an RSTD value with the lowest uncertainty is reported.

3. The method of claim 1, wherein among the measurement results for the PRSs transmitted from the at least two BSs, the measurement result with the highest reference signal received power (RSRP) value or the measurement result with the highest reference signal received quality (RSRQ) value is reported.

4. The method of claim 1, wherein measurement result reported for the at least two BSs having the same location identifier comprises at least one of an identifier indicating the BS related to the reported measurement result, a reference signal received power (RSRP) value related to the reported measurement result, and a reference signal received quality (RSRQ) value related to the reported measurement result.

5. The method of claim 1, further comprising receiving, from the serving BS, an indicator indicating the number of BSs for which the UE needs to report measurement results.

6. The method of claim 1, further comprising transmitting, to the serving BS, an indicator indicating the number of BSs for which the UE will report measurement results.

7. A user equipment (UE) configured to report a measurement result for position determination in a wireless communication system, the UE comprising:
    a transceiver; and
    a processor that:
    controls the transceiver to receive positioning reference signal (PRS) related information including position identifiers of a plurality of base stations (BSs);
    measures a PRS transmitted from each of the plurality of BSs using the PRS-related information;
    check whether there are at least two BSs having the same position identifier among the plurality of BSs based on the PRS-related information; and
    when at least two of the BSs have the same position identifier, reporting to a serving BS, a number of PRS measurement results, wherein the number of measurement results reported is less than the number of BSs that make up the plurality of base stations, and
    wherein the position identifiers of the at least two BSs are the same, when a distance between the at least two BSs is equal to or smaller than a specific value.

8. The UE of claim 7, wherein the processor reports the measurement result with the lowest reference signal time difference (RSTD) value or the measurement result with an RSTD value with the lowest uncertainty among the measurement results for the PRSs transmitted from the at least two BSs.

9. The UE of claim 7, wherein the processor reports the measurement result with the highest reference signal received power (RSRP) value or the measurement result with the highest reference signal received quality (RSRQ) value among the measurement results for the PRSs transmitted from the at least two BSs.

10. The UE of claim 7, wherein the measurement result reported by the processor for the at least two BSs having the same location identifier comprises at least one of an identifier indicating the BS related to the reported measurement result, a reference signal received power (RSRP) value related to the reported measurement result, and a reference signal received quality (RSRQ) value related to the reported measurement result.

11. The UE of claim 7, wherein the processor further controls the transceiver to receive, from the serving BS, an indicator indicating the number of BSs for which the UE needs to report measurement results.

12. The UE of claim 7, wherein the processor further controls the transceiver to transmit, to the serving BS, an indicator indicating the number of BSs for which the UE will report measurement results.

* * * * *